United States Patent [19]

Perdue, Jr. et al.

[11] Patent Number: 5,022,689
[45] Date of Patent: Jun. 11, 1991

[54] SUSPENDABLE HINGED LOCKABLE LID STORAGE BOX

[75] Inventors: Thomas F. Perdue, Jr., Crystal Lake; Jeffrey D. Bransky, Claredon Hills; William S. Carvell, Mount Prospect; David E. Dettloff, Skokie; Duane K. Ischay; Kenneth H. Oberg, both of Barrington, all of Ill.

[73] Assignee: Acco World Corporation, Wheeling, Ill.

[21] Appl. No.: 595,510

[22] Filed: Oct. 11, 1990

Related U.S. Application Data

[62] Division of Ser. No. 331,408, Mar. 31, 1989, Pat. No. 4,976,373.

[51] Int. Cl.⁵ ............................................. E05C 19/06
[52] U.S. Cl. ...................................... 292/19; 24/591
[58] Field of Search .................. 292/17, 19, 59, 91, 292/204, 209; 24/595, 590, 591

[56] References Cited

U.S. PATENT DOCUMENTS

| 442,758 | 12/1890 | Soden | 292/19 |
| 1,691,975 | 11/1928 | Irwin | 292/91 X |
| 3,744,828 | 7/1973 | Goldberg | 292/59 |
| 4,342,139 | 8/1982 | Tanaka | 24/591 X |

Primary Examiner—Richard E. Moore
Attorney, Agent, or Firm—Pennie & Edmonds

[57] ABSTRACT

A key lockable arrangement for locking two members in abutting relationship comprising a cylinder button mounted in the first member for turning therein and having elements on a lower portion thereof which form an S-shape, to be received in a housing in the second member. The elements lock in the housing by freely entering same, flex upon rotation, and then remain unflexed in locking position.

2 Claims, 10 Drawing Sheets

SUSPENDABLE HINGED LOCKABLE LID STORAGE BOX

This is a division of application Ser. No. 07/331,408 filed Mar. 31, 1989, now U.S. Pat. No. 4,976,373.

BACKGROUND OF THE INVENTION

While numerous object holders with hinged tops have been used and proposed, none have provided versatility and utility in temporary storage use, in displaying objects for selection or otherwise accomplishing storage and exhibition during active use.

SUMMARY OF THE INVENTION

Broadly, the present invention comprises a storage box unit with a chamber housing for temporary and permanent storage of objects such as diskettes, cassettes or other relatively thin planar objects and a lid hinged to the chamber to provide a closed storage box whose contents are readily accessible. The hinged lid is connected to the housing by means of pivot pins to provide a closed position, a first open position in which the lid is held at an angle to the horizontal and a second fully opened lock position.

It is a feature that the box unit is lockable by a key-operated plastic molded deflectable lock.

It is a feature of the storage box unit that it can be suspended between two (2) spaced-apart supports such as the sides of a drawer.

Figure 10:
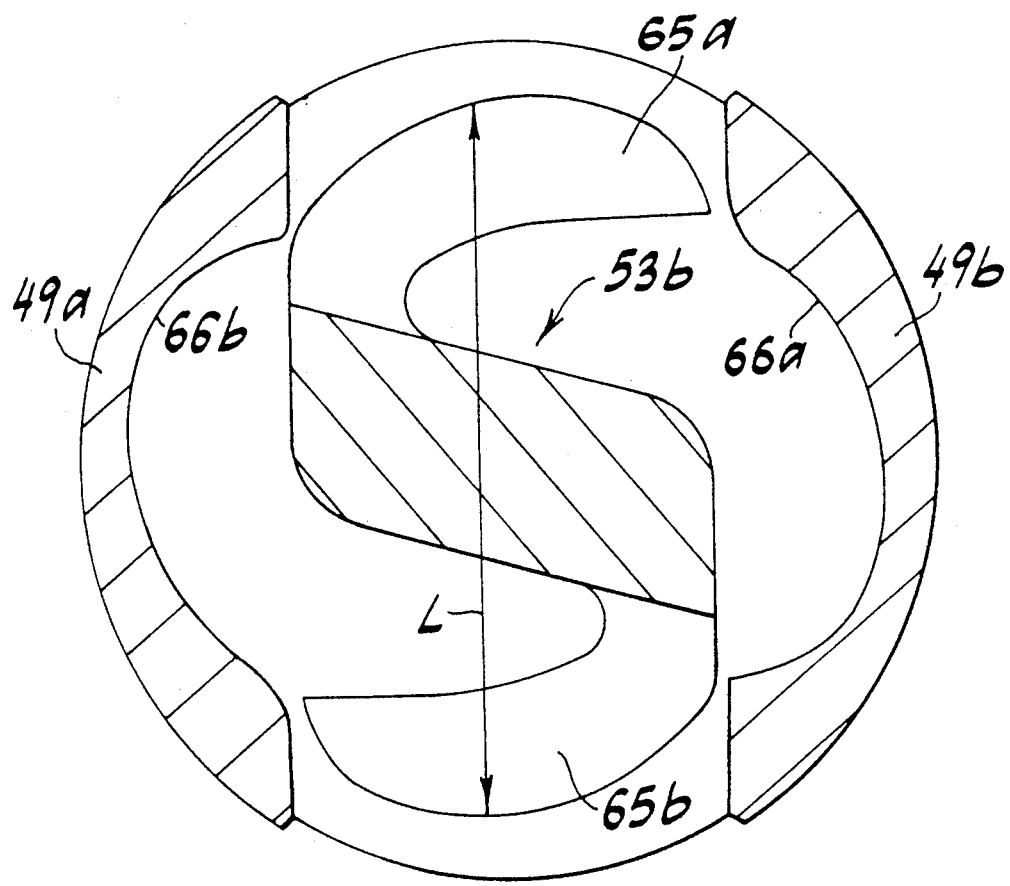
FIG. 10 is a partial sectional view along line 1—10 of FIG. 9.
Figure 13:
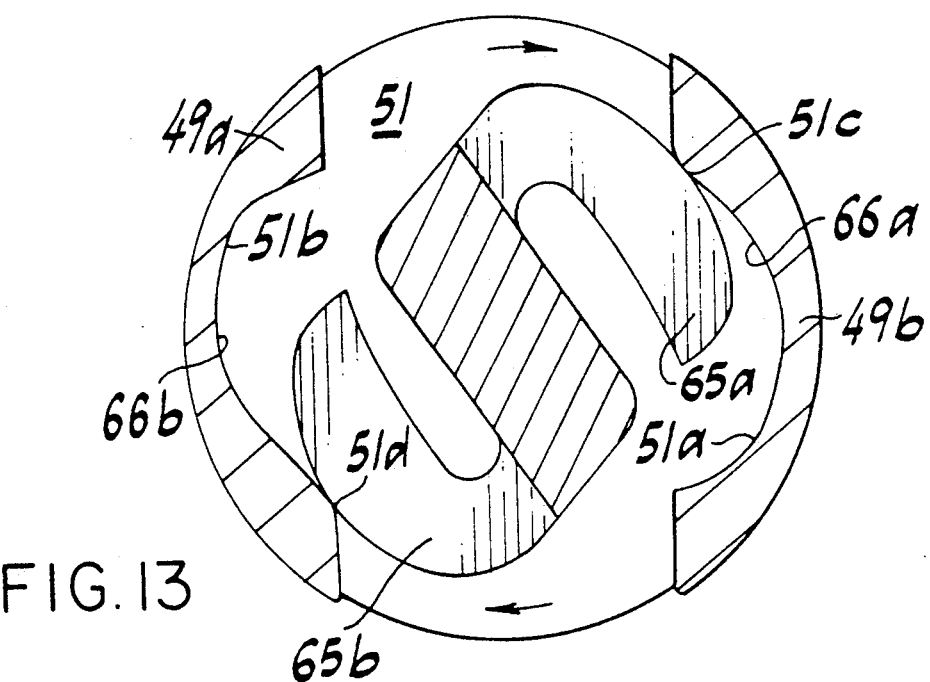
FIG. 13 is similar to FIG. 10 in which the lock has been partially.

FIG. similar to FIG. 10 and 13 and enlarged in which the lock has been turned to the fully locked position.

DESCRIPTION OF THE PREFERRED EMBODIMENT

Figure 6:
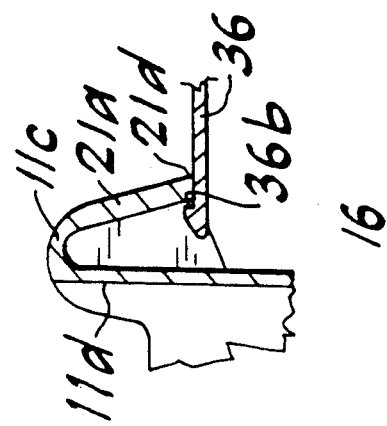
FIG. 6 is a partial view of the chamber back wall and showing the lock tab on the lid in its second open lock position.
Figure 5:
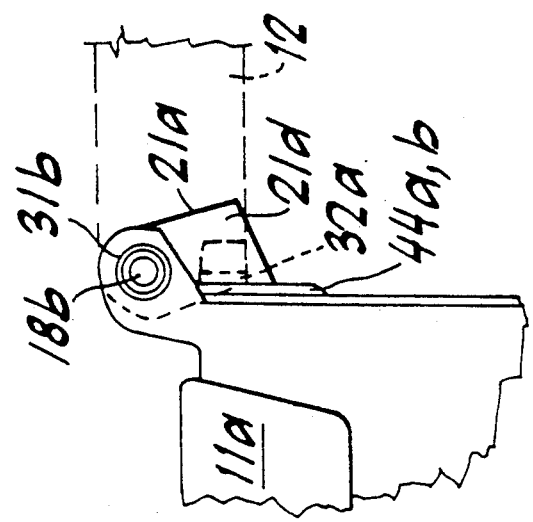
FIG. 5 is a partial view showing the lock arrangement for locking the lid in its second suspendable open position.
Figure 7:
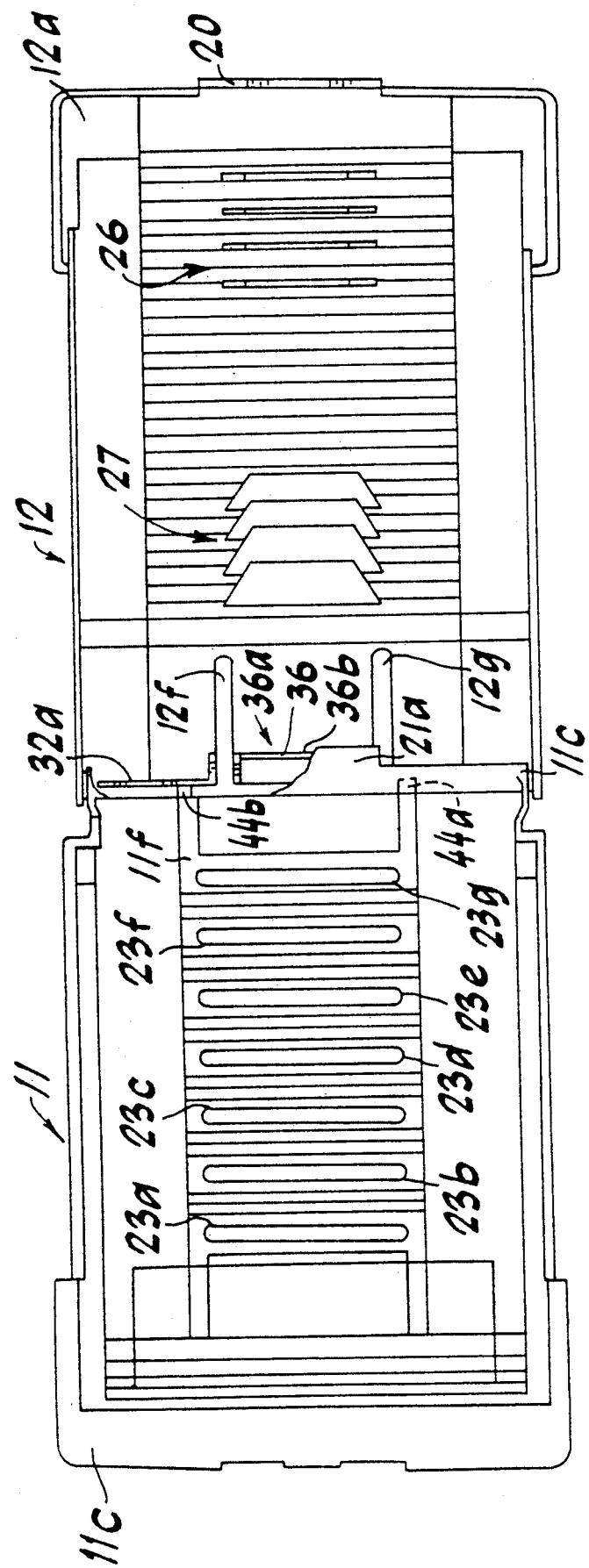
FIG. 7 is a top plan view of the unit in its second open position.
Figure 8:
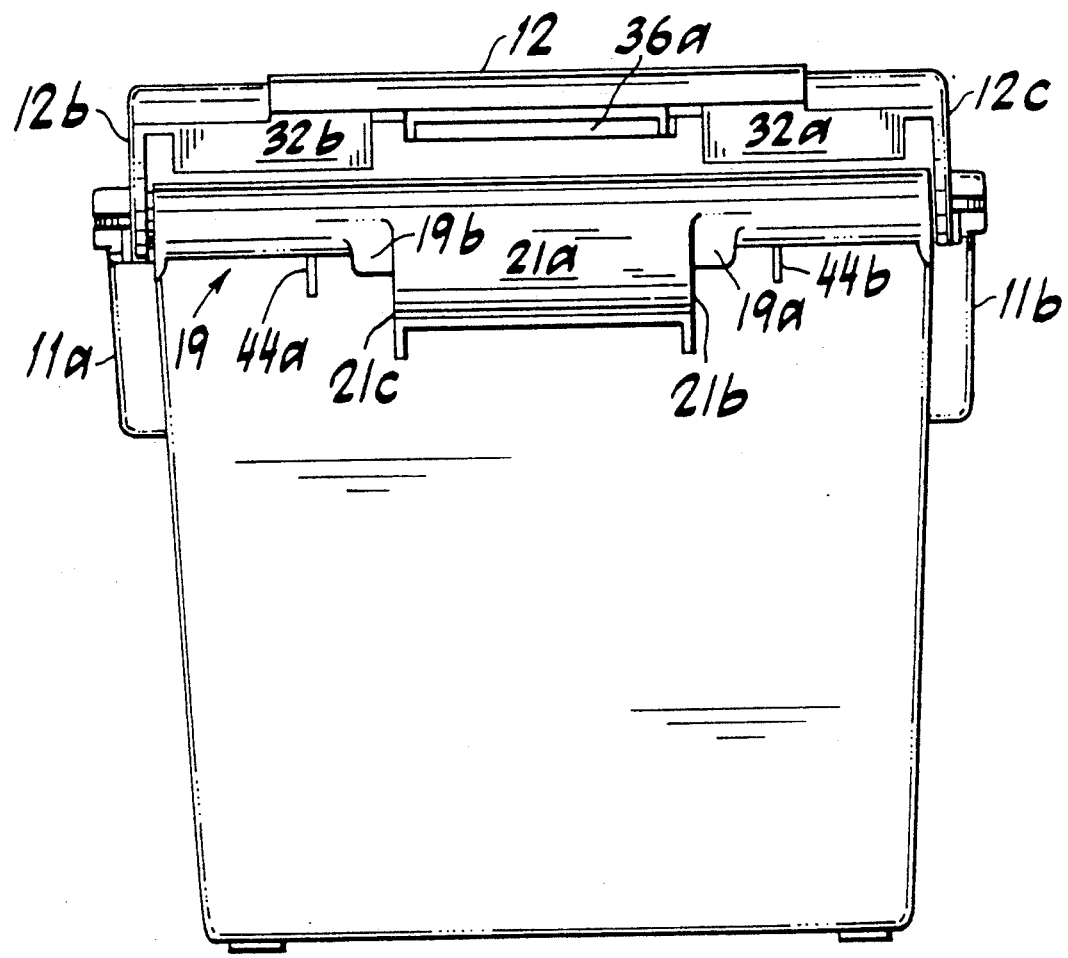
FIG. 8 is a back end elevational view of the unit with the lid closed.

In FIGS. 1-8, storage tray unit 10 includes object holding chamber body 11 and enclosure lid 12 pivotally connected about pivot arrangement 13 for holding lid 12 in a first angled position using stop means 14 comprising skirt stop portions 19a, 19b (FIGS. 4, 5 and 8) and in a second generally horizontal locked position utilizing lock arrangement 16 (FIGS. 6 and 8). Objects readily storable in unit 10 are computer diskettes, mini data cartridges or other similarly-shaped planar objects.

Figure 1:
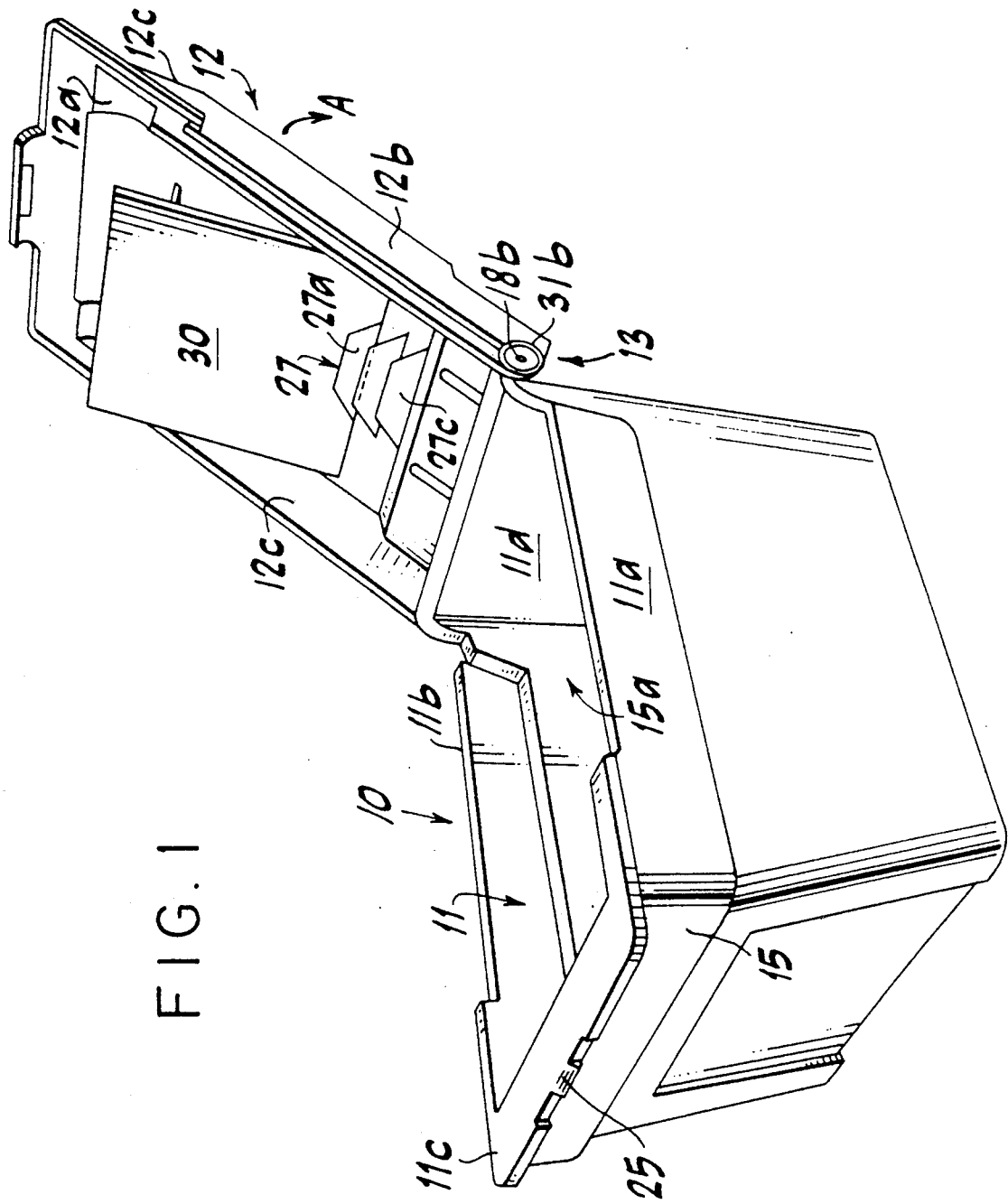
FIG. 1 is a perspective view of the unit with the lid in a first open position.

Body 11, which is preferably molded as a complete unitary piece of plastic material (but may be assembled from two or more parts) includes body skirts 11a, 11b and front generally horizontal protruding support lip element 11c. Adjacent lip 11c is generally vertical body portion 15. Back vertical wall 11c has upper curved portion 11e, back skirt 19 depending from portion 11e and spaced from wall 11d. Skirt 19 includes right and left depending skirt stop portions 19a, 19b. Also shown in FIG. 8 is centered lock tab hood 21 with angled panel 21a, and end panels 21b and 21c. Angled panel 21a has lower lip 21d which catches lid lock tab 36 as further explained (FIGS. 6 and 8). Also shown projecting from body wall 11d are outwardly protruding spaced-apart ribs 44a, 44b. Body II includes on its bottom support floor 11f having parallel spaced-apart depressed slots 23a-23g for receiving movable divider frame 24. Divider frame 24, with window opening 24a, carries a projection (not shown) at its base to support frame 24 vertically, as shown in FIG. 1, in any selection slot 23a-23d. Body chamber opening 15a lies substantially in a plane parallel to floor 11f.

Enclosure lid 12 includes planar member 12a, side pieces 12b, 12c and shallow border lip 12d. Unit latch tongue 20 includes slot 20a for snap engagement with projection 25 on body lip 11c. Planar pieces 12b and 12c extend below planar member 12a forming left and right maintaining unit 10 between two (2) selected spaced-apart hanger members. Also formed in lid 12 are two track sets 26, 27 for temporary usage of objects 30 as vertically supported. Track set 27 includes rails 27a-27d at an angle to planar lid member 12a and set 26 has rails 26a-26d perpendicular to planar member 12a.

Figure 2:
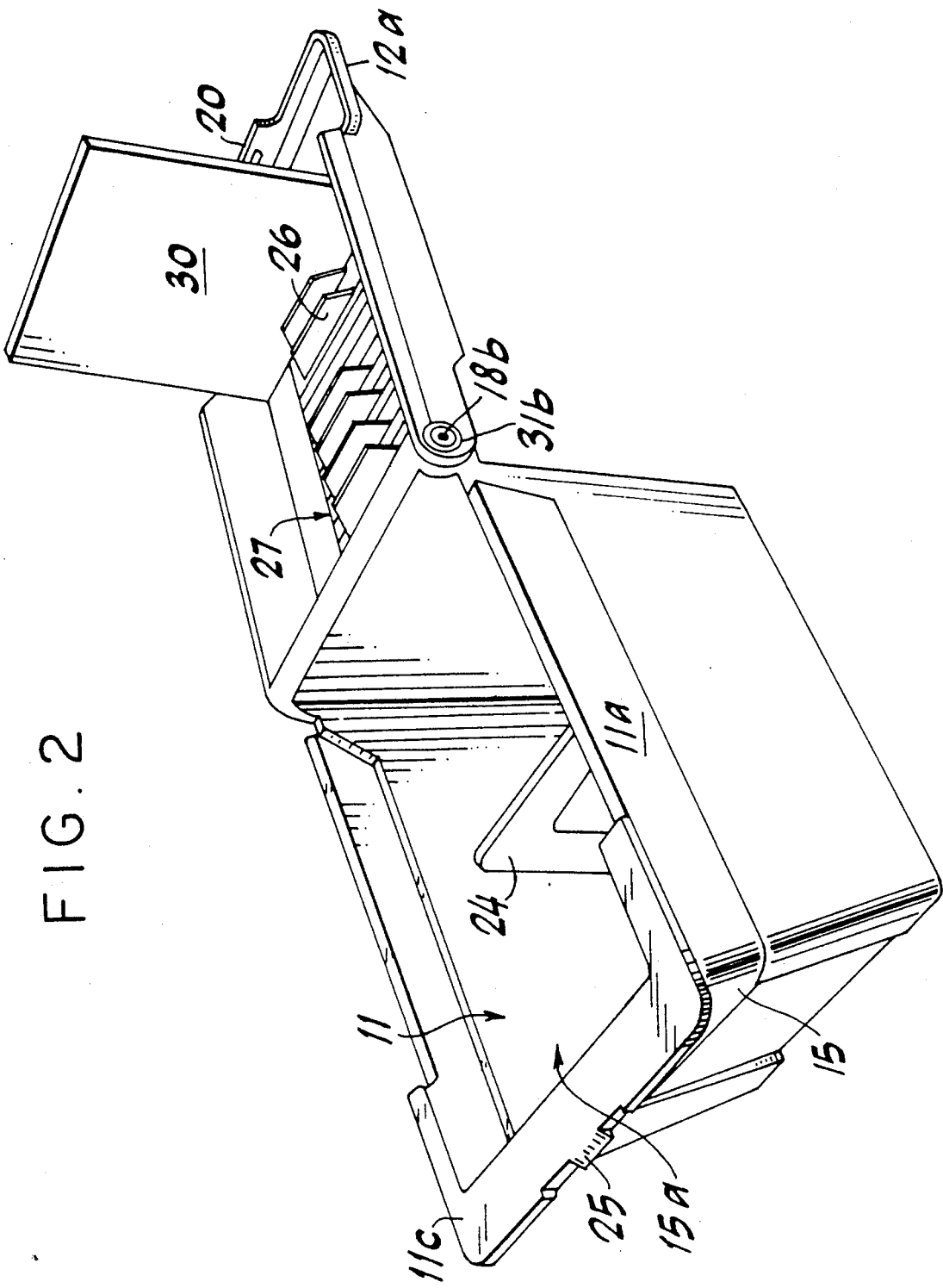
FIG. 2 is a perspective view of the unit with the lid in a second open lock position.
Figure 4:
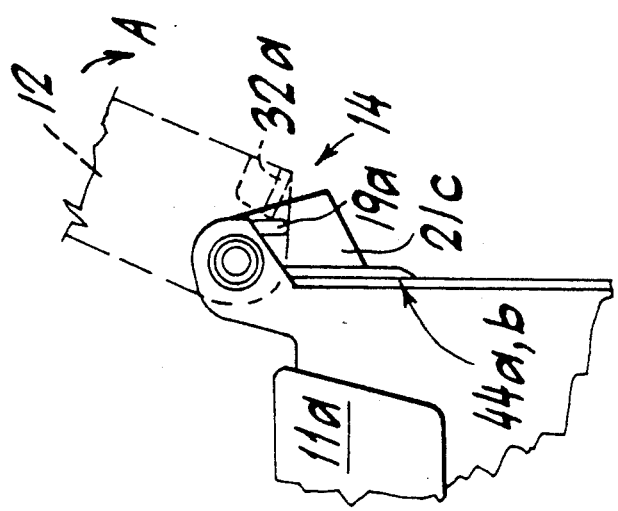
FIG. 4 a partial view of the lid pivot and stop arrangement.

Pivot arrangement 13 includes right and left chamber body protrusions 18a, 18b about which round holes 31a, 31b in lid side pieces 12a, 12b rotate to position lid 12 at selected positions. Supporting lid 12 in its first open position (FIG. 1) are spaced-apart deflectable finger stop means 32a, 32b integrally formed in and at right angles to lid 12 (FIG. 8) which rest against skirt body stop portions 19a, 19b in the first stop position (FIG. 4). When lid 12 is moved from the position shown in FIG. 1 in the direction of arrow A, lid fingers 32a, 32b deflect and ride outwardly briefly along the surface of stop portions 19a, 19b as fingers 32a, 32b and stop portions 19a, 19b bend and otherwise distort thus permitting lid 12 to move past stop means 14 and downwardly. As lid 12 is further moved in direction A, the second, fully open lock position shown in FIG. 2, is reached.

Figure 3:
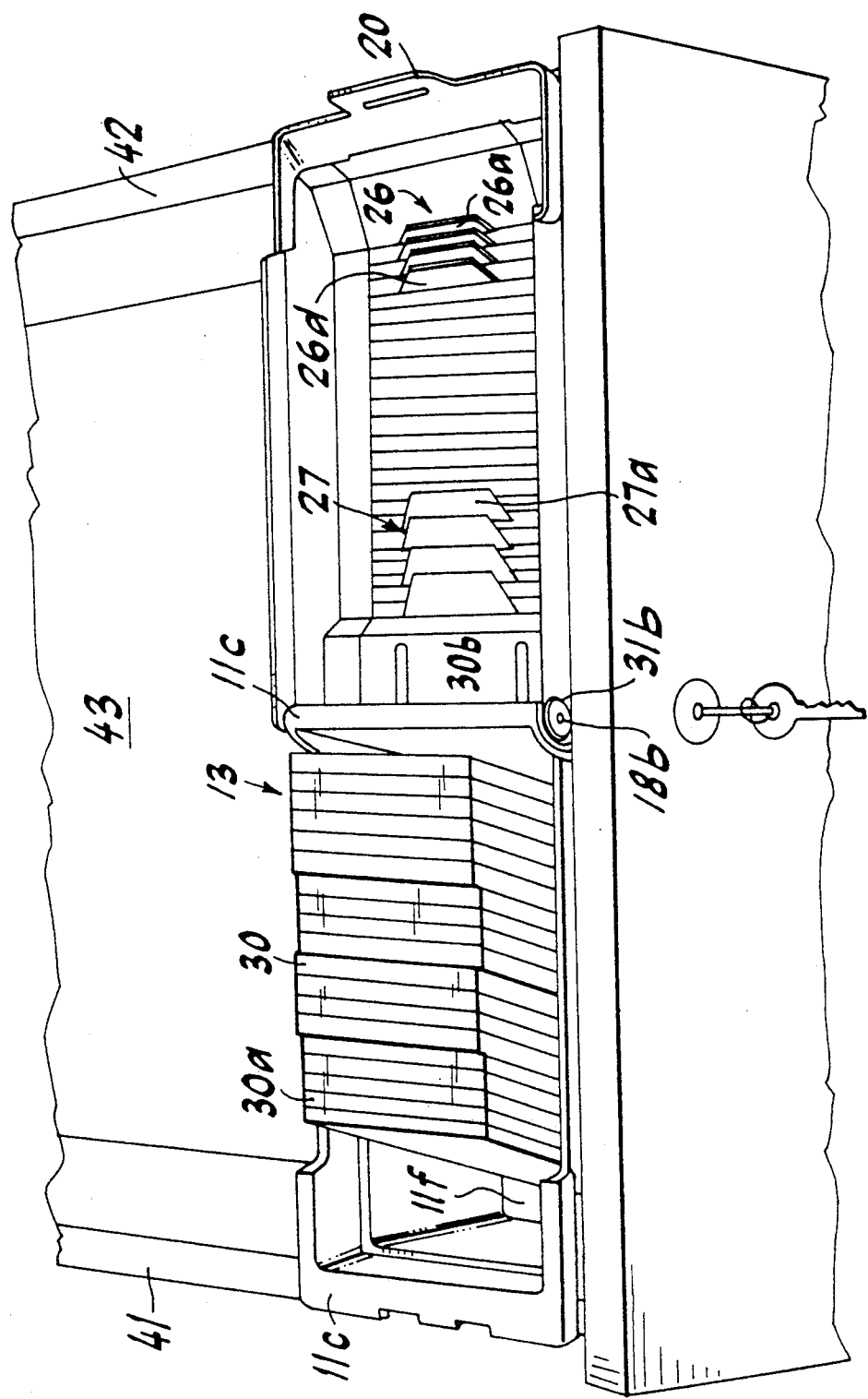
FIG. 3 is a perspective view showing the unit suspended on the sides of a desk drawer.

Turning to FIGS. 6, 7 and 8, lock arrangement 16 includes deflectable lid tab 36 having on its underside U-shaped lip ridge 36a and ridge surface 36b (FIG. 6) for engagement with hood angled panel 21a. Tab 36 having lid slots 12f, 12g on either side deflects until its U-shaped ridge 36a engages the inside surface of panel 21a. In this latched position, unit 10 can be suspended between spaced-apart locations with the end of member 12a and body lip 11c resting on spaced-apart surfaces such as drawer sides 41, 42 of drawer 43 (FIG. 3). By deflecting lid tab 36, the locking arrangement 16 is moved to its unlocked position. The purpose of ribs 44a, 44b is to remove the clearance between the lid tab 36 and the outside of body wall 11d, when lid 12 is in the 180° open second latched position. Lid fingers 32a and 32b press against ribs 44a, 44b, causing fingers 32a, 32b to deflect as the latch engages (FIG. 6). This creates a tension (or pre-load) between the lid 12 and arrangement 16. Also shown in FIG. 3 are a stack of objects with forward end object 30a and rearward end object 30b.

Turning finally to FIGS. 9-14, an alternative latch and key system 55 is shown positioned in a modified lid 12' of a modified body lip 11c, in which lid 12' and lip 11c, carries latch button 50 having an upper key-turnable section 51, middle section 52 and depending lower lock portion 53 including stem 53a and S-shaped flexible lock piece 53b. Button 50 and middle section 52, which is preferably molded of flexible plastic material, is snap-fitted into circular hole 47 at the bottom of recess 12r in lid 12'. Button 50 is rotatable in such snap-fit position between the bottom surface 51a of key-turnable section 51; the upper surface 52a of middle section 52 and lid 12'. Key-turnable section 51 is sized and shaped so that is cannot, as housed in lid recess 12r for security reasons, be turned using one's fingers. Key-turnable section 51 can only be turned by key 46 having key body 46a, key handle 46b, key recess 46c including key recess projection 46d which mates with complementing section recess 51b (see FIGS. 9 and 9a).

Figure 9:
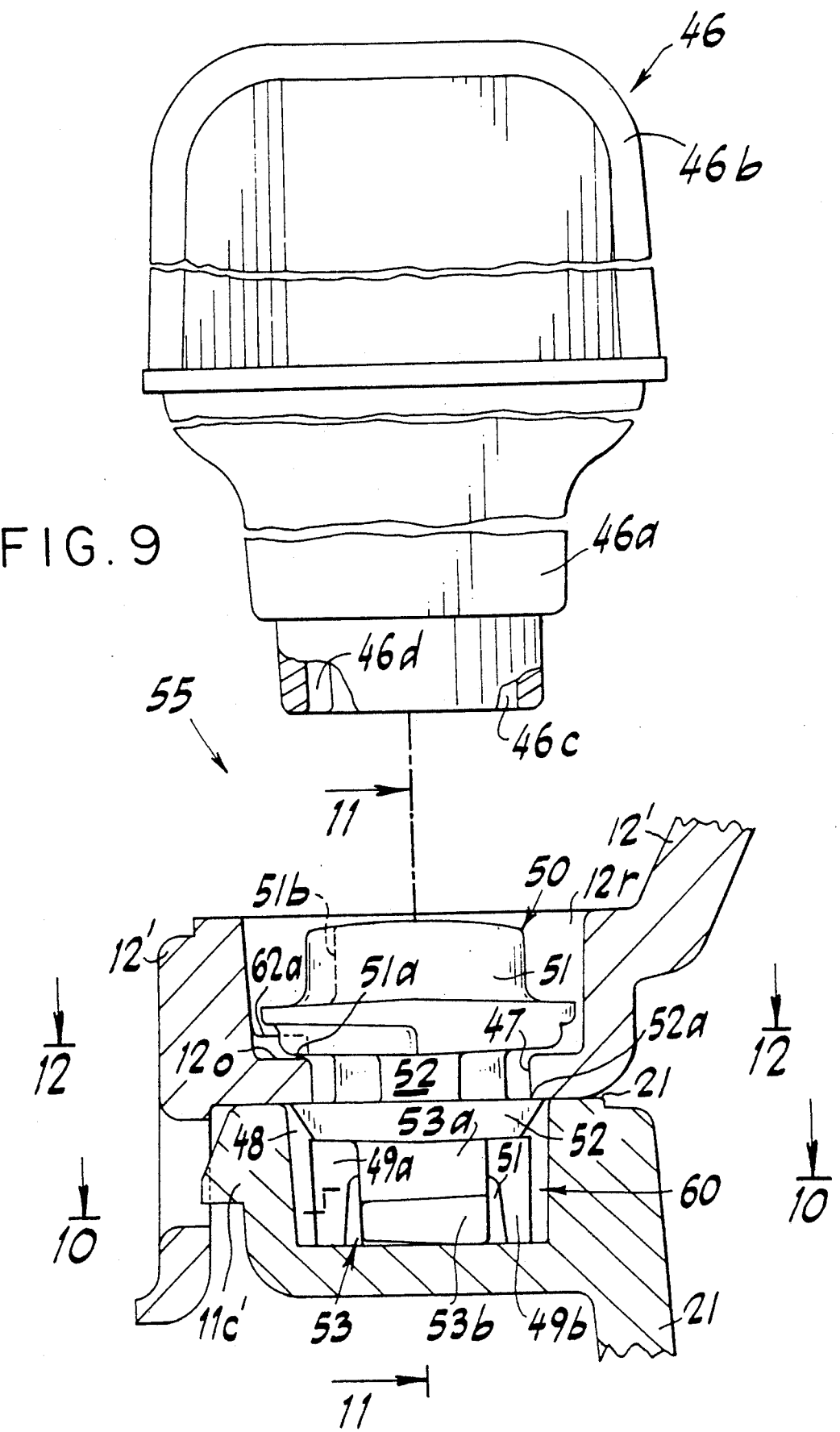
FIG. 9 is an enlarged partial sectional view of an alternative unit latch including key.
Figure 11:
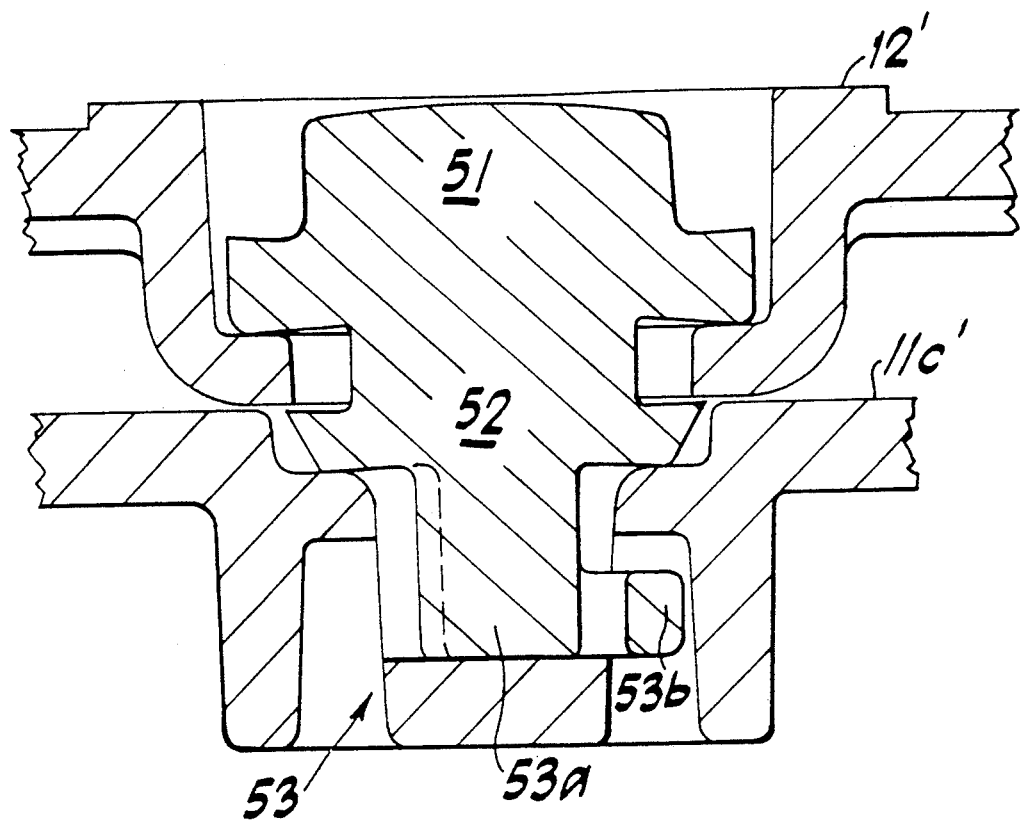
FIG. 11 is a vertical sectional view through the alternative latch.
Figure 9A:
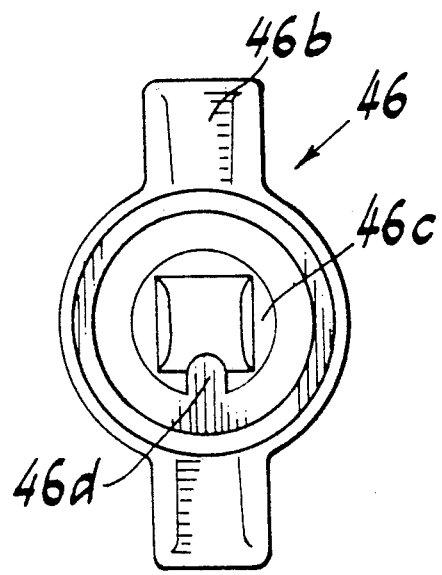
FIG. 9a is a plan view of the key.
Figure 14:
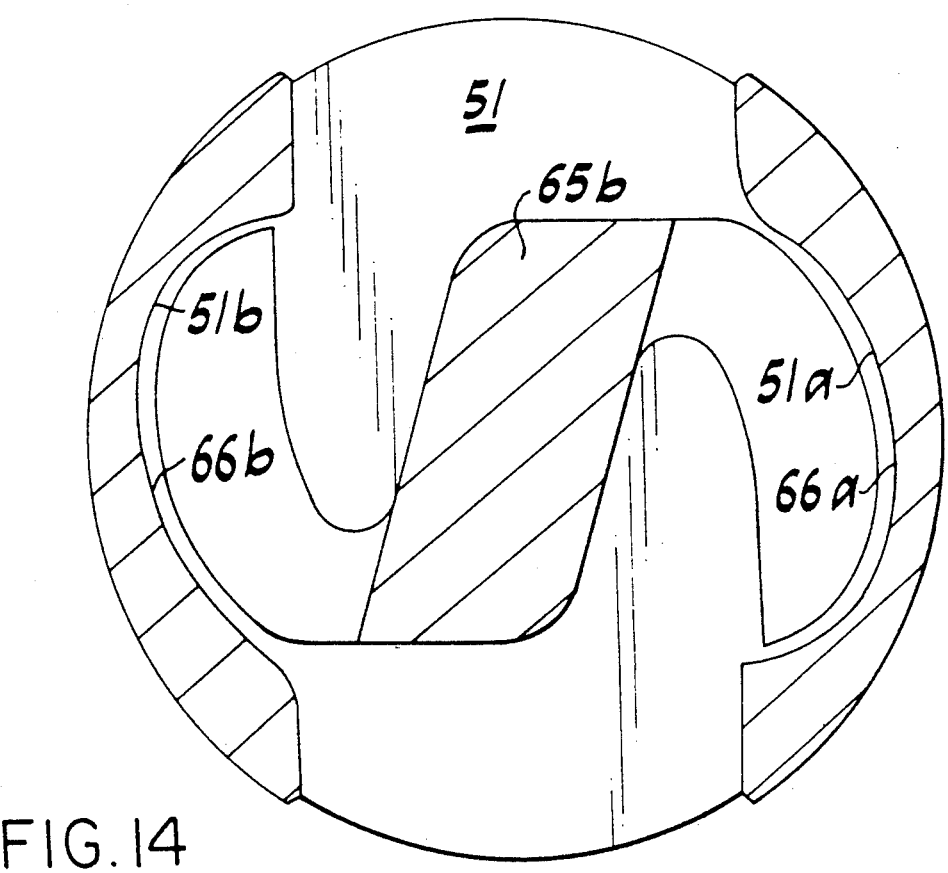

Chamber housing lip 11c' includes cylindrical lock recess 48, lid lock element 60 including half-moon spaced apart hollows 49a and 49b (see FIGS. 10, 13 and 14). To accomplish locking, cylinder button 50 is turned until S-shaped lock piece 53b is oriented as shown in FIG. 10 and lid 12' is closed as shown in FIGS. 9-10 with lid 12' and lip 11c in abutting position. As lid 12' is closed S-shaped lock piece 53b moves downwardly into lock recess 48 to a position opposite hollowed dividers 49a, b (FIGS. 9 and 10). The limits of turning of cylinder button 51 are determined by stationary raised lid stops 62, 62a spaced-apart on recess bottom 12o of lid 12' (see FIG. 12) and stop surfaces on the bottom portion section 61 of key-turnable of section 51. In particular, bottom 61 is configured with spaced-apart stop-engaging surfaces 61e, d, f and g. Surfaces 61e, d, f and g are spaced apart and located so that bottom section 61 and, therefore, button 50 itself, can be turned only ninety (90°) degrees to the left and only ninety (90°) degrees back to the right.

Figure 12:
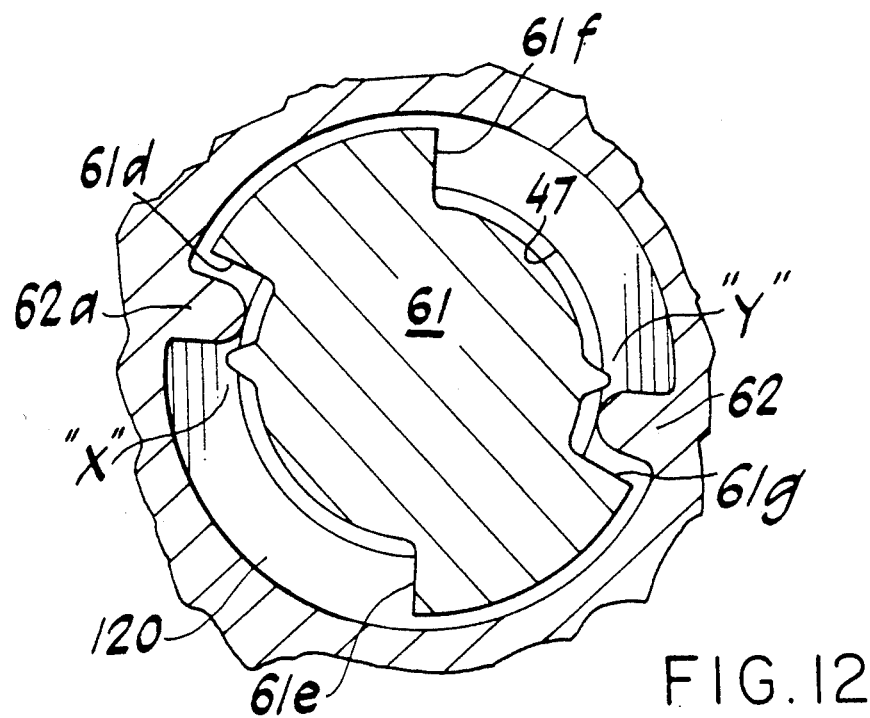
FIG. 12 is a sectional view along line 10—10 of FIG. 9.

Also on the bottom portion of 61, two protrusions "X" and "Y" are formed (FIG. 12). These protrusions engage the stationary stops 62 and 62a in a temporary lock "open" position and provide alignment of the S-shaped lock piece 53b to the lock recess 48. When the key-turnable section 52 is rotated with the key 46 the detents are overcome and the S-shaped lock is allowed to engage.

During the turning clockwise (as viewed from above) of bottom section 61 as so limited, flexible lock piece 53b including its s-wings 65a, 65b engage irregularly curved walls 66a, 66b of hollow cam elements 49a, b and since flexible piece 53b is longer (see length L of FIG. 10) than the maximum distance between entrance portions 51c and 51d of walls 66a, 66b, lock piece s-wings 65a and 65b are caused to compress and deform (FIG. 13). Once turning of ninety (90°) degrees to the lock position is complete (FIG. 14), s-wings 65a, 65b restore themselves. Without compression and fit, with some clearance, between walls 66a, 66b in a restored non flexed condition (FIG. 14). To unlock lid 12', cylinder button 50 is rotated ninety (90°) degrees in the opposite direction since stops 61e, d, f and g prevent any other movement, and s-wings 65a, 65b are again compressed until the unlock position of FIG. 10 is reached.

In the operation of the tray unit 10, its flat-bottomed body 11 can be placed on any generally horizontal surface and with lid 12 opened to a first 120° angled position due to the shape, proportion and weight of body 11 and lid 12' unit 10 remains stable even when weight is added as objects are moved from body 11 to tracks 26, 27 on lid 12 for display and active use. Unit 10 also can be used by fully opening lid 12 until the lock arrangement 16 and tab 36 move behind panel 21a to snap to its lock position permitting unit 10 to be suspended in such second open position between two spaced-apart support pieces 41, 42 (FIG. 3). In its suspended position chamber opening 15a and lid planar support element portion 12a lie generally in a plane.

Lock arrangement 16 is strong enough to withstand the weight of the objects stored in body II and on the lid 12 and other forces applied to it in normal use as the objects are added and removed but does not exhibit such strength that forces on body 11 and lid 12 move them toward a closed position readily deflecting or distorting tab 36 to move lock arrangement 16 to its open unlock position.

We claim:

1. A key lockable arrangement for locking a first member abbutingly to a second member including a turnable lock cylinder and a key comprising
   cylinder button means mounted in the first member for turning movement therein said cylinder button means including an upper portion which is key-turnable and a lower portion which has flexible lock elements;
   a configured housing in the second member to receive said flexible lock elements in unflexed position when the first and second members are in abutting relationship and key means to flex the flexible lock elements when the cylinder button means is partially turned and to receive the flexible elements in a second unflexed position upon further turning of the button means.
   whereby the button means tends to stay in either of the two unflexed positions until turned using the key to move the element through the flexed position.

2. The lock arrangement of claim 1 in which the flexible lock element are formed as an S-shape.

* * * * *

UNITED STATES PATENT AND TRADEMARK OFFICE
CERTIFICATE OF CORRECTION

PATENT NO. : 5,022,689

DATED : June 11, 1991

INVENTOR(S) : Perdue, Jr. et al

It is certified that error appears in the above-identified patent and that said Letters Patent is hereby corrected as shown below:

Column 1, line 54, "line 1-10" should read --line 10-10--.

Column 1, line 62, "FIG. similar to FIG. 10" should read --FIG. 14 is similar to FIG. 10--.

Column 2, line 12, "element 11c Adjacent" should read --element 11c. Adjacent--.

Column 2, line 13, "Back vertical wall 11c" should read --Back vertical wall 11d--.

Column 2, line 22, "Body II" should read --Body 11--.

Column 3, line 7, "stack of objects" should read --stack of objects 30--.

Column 3, lines 12-13, "lip 11c" should read --lip 11c'--.

Column 4, line 19, "lid 12' unit" should read --lid 12, unit--.

Column 4, line 30, "body II" should read --body 11--.

Signed and Sealed this

Nineteenth Day of January, 1993

Attest:

DOUGLAS B. COMER

*Attesting Officer*     *Acting Commissioner of Patents and Trademarks*